This invention relates to a process for preparing tough, high molecular weight polymeric film and sheeting materials which exhibit a high degree of fire-retardancy. More particularly, it relates to a process which can be continuous, whereby chloral monomer, either alone or in combination with one or more suitable monomers copolymerizable therewith, may be polymerized directly into tough and durable film and sheeting.

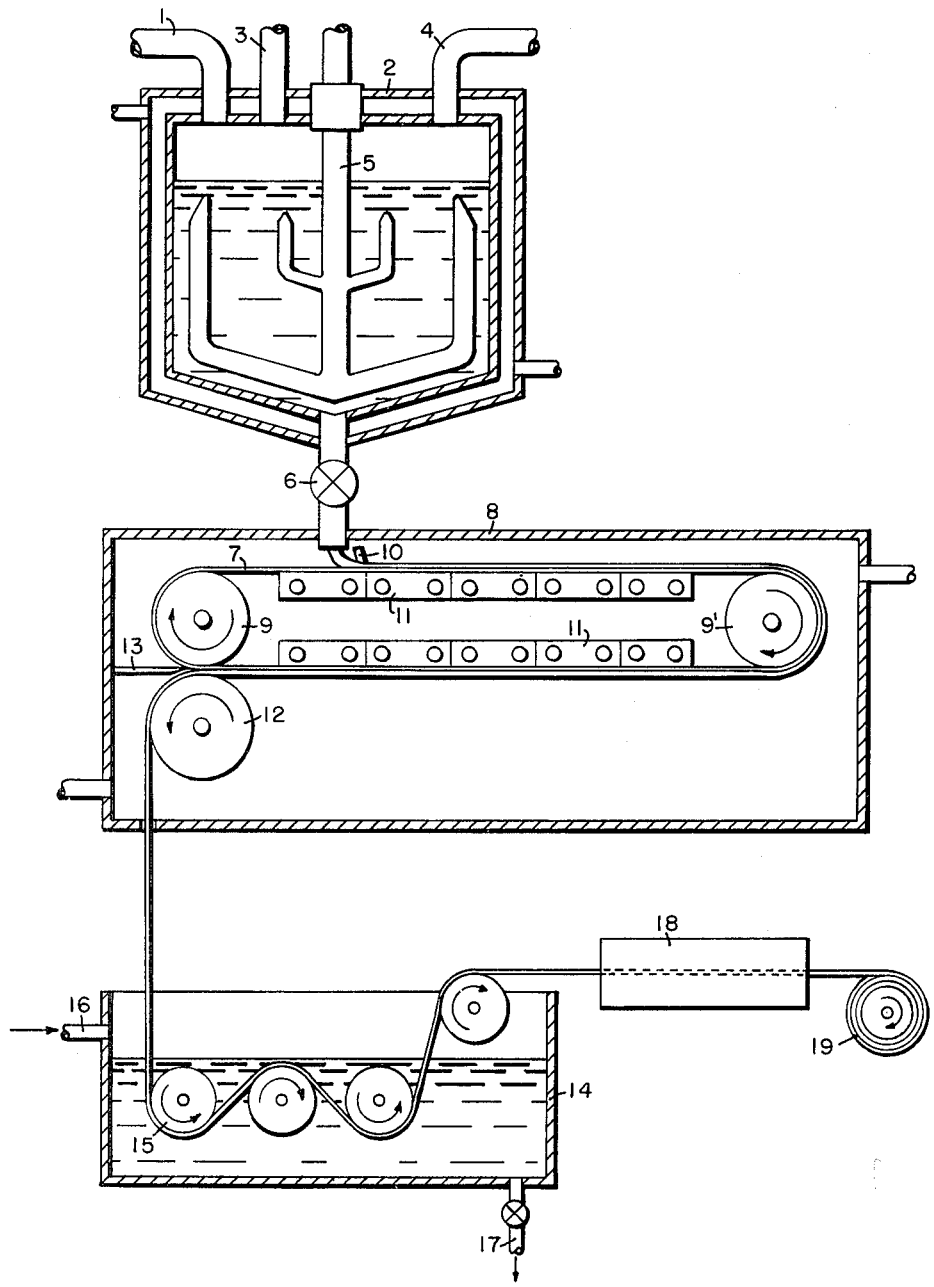
INVENTORS
GEORGE H. MC CAIN
DONALD E. HUDGIN
BY *Warburton & Cross*
ATTORNEYS 3,254,052
PROCESS FOR POLYMERIZING CHLORAL
George H. McCain and Donald E. Hudgin, Painesville, Ohio, assignors to Diamond Alkali Company, Cleveland, Ohio, a corporation of Delaware
Filed May 31, 1962, Ser. No. 198,975
10 Claims. (Cl. 260—67)

It has long been known in the art to polymerize chloral monomer by contacting it under suitable conditions with ionic polymerization catalysts, such as sulfuric acid, and pyridine. Solid chloral polymers prepared with these catalysts are generally thermally unstable and are of low molecular weight. More recently, it has been shown by Furukawa and co-workers, reporting in Makromolekulare Chemie, 44–46, pages 398–407, that moderate conversions of chloral monomer to higher molecular weight polymer may be effected by using as the polymerization catalyst, an organometallic compound, such as butyl lithium, diethyl zinc, cadmium dialkyl and boron trialkyl. The polychloral obtained in moderate yield by this process is in the form of agglomerated particles. These agglomerates must subsequently be washed, dried and ground or otherwise pulverized before the polymer can be processed into useful plastic articles, e.g., film, moldings, extrusions and the like. Additionally, techniques employed to fabricate the polymer into such articles may be, and oftentimes are, complex and involved.

It is the object of this invention, therefore, to provide a polymerization process whereby chloral monomer, or a mixture of chloral monomer with one or more suitable comonomers copolymerizable therewith, may be converted in substantial yield to high molecular weight polymer.

It is another object of this invention to provide a method whereby tough polymeric film and sheeting products may be prepared simultaneously as chloral monomer, or a monomer mixture containing said chloral, is polymerized, thereby making it unnecessary to process the formed polymer further.

These and other objects will be apparent in the description of the invention which follows:

The present invention comprises thoroughly mixing in the presence or absence of an inert organic liquid reaction medium, liquid chloral monomer, or monomer mixture and the desired amount of polymerization catalyst in a mixing chamber for a time sufficient to convert an appreciable portion of said monomer or monomer mixture to polymer, withdrawing from the mixing chamber a flowable mixture of polymer, unreacted monomer and polymerization catalyst and casting said mixture as a layer onto a solid substrate contained in a second chamber, completing the polymerization of the film while it is supported in the second chamber, thereafter withdrawing the polymerized film from said second chamber, subjecting it to a washing and drying treatment and finally collecting it on a film-winding mechanism.

In a particular embodiment of the invention, as illustrated by the accompanying drawing, liquid chloral monomer is introduced through jacketed line 1 into the jacketed mixing chamber 2 which is maintained at a temperature of −78° C., by passing refrigerant through the mixer jacket. n-Heptane solvent is introduced through line 3. A n-heptane solution, containing in admixture about 1 part, 2,6-dimethoxyphenyl lithium by weight to about 3 parts diethyl zinc by weight, is introduced through jacketed line 4, said catalyst complex being added to the mixing chamber in an amount equivalent to about 0.7 percent by weight of chloral. An inert atmosphere is maintained in the monomer, the solvent and catalyst storage containers, the reactant addition lines and in the mixing chamber.

The reactants contained in mixing chamber 2 are then vigorously mixed by an agitator 5 of variable speed. In order to insure thorough mixing, this agitator is operated at about 5000 r.p.m. at the start of the reaction; it is rotated at a higher speed as the polymerization progresses and the mixture becomes less fluid.

The reactant mixture containing the desired amount of polymer is then withdrawn through valve 6 and dropped onto a moving belt 7 which is enclosed in a chamber 8, likewise maintained under an inert atmosphere. The belt 7 is mounted under tension on two cylinders 9 and $9^1$ situated on the same level but at some distance apart, and rotated in the same direction.

As the reactant mixture is applied to the belt, it is spread or cast by a doctor blade 10 of adjustable height, said doctor blade being positioned just behind the valve through which the mixture is introduced. The belt with the applied layer of polymeric mixture thereon is advanced over a series of heat exchangers 11 through which refrigerant is circulated to maintain the temperature of said polymeric mixture at about −60° C. Refrigerant is likewise circulated through cylinder $9^1$ so that the polymerization temperature is maintained continuously throughout. The polymerization of the monomer, which has been partially effected in mixing chamber 2, is completed as the polymeric mixture is moved through the casting chamber 8. The thickness of the polymerized film layer is further gauged by passing it between cylinders 9 and 12, said cylinder 12 being vertically adjustable so that various clearances between it and cylinder 9 are possible.

The loosely adhering polymerized film is then removed from the belt by a blade 13 and is advanced into a treating chamber 14 wherein it is washed to remove any unreacted monomer, solvent and remaining catalyst residues. Within the treating tank, the film is passed over a series of rollers 15 rotated alternately in an opposite direction. The treating tank is fitted with an adduct valve 16 whereby fresh treating solution may be admitted; and a withdrawal valve 17, from which solution containing monomer, solvent and/or catalyst residues may be withdrawn and cycled to apparatus for reclaiming these materials.

After the polymer film has been subjected to the washing treatment, it is drawn through an oven 18 maintained at a temperature of about 100° C., and dried. The finished, dried film is then wound on a film-winding mechanism 19.

In a continuously operated process, there may be employed one or more successively spaced connected mixing chambers in addition to mixing chamber 2 through which the polymeric mixture prepared in chamber 2 is cycled before being deposited on the solid substrate and cast into film. As the mixture is advanced and mixed in each chamber, the percentage of converted monomer therein is progressively increased. Concurrently, additional quantities of polymeric mixture are being prepared in chamber 2 by the addition thereto of fresh monomer, polymerization catalyst and liquid reaction medium.

While the present invention has been described hereinabove in a particular embodiment thereof, it is to be understood that other modifications may be employed herein which are within the scope of this invention.

With regard to the polymerization, for example, chloral monomer may be polymerized alone or it may be reacted in admixture with up to 90% of one or more suitable monomers copolymerizable therewith. When such suitable comonomers are employed in the process, the means by which these materials may be introduced into the mixing chamber is optional. For example, they may be introduced as a monomer mixture, having been thoroughly premixed with chloral prior to addition. These comonomers may likewise be reacted with equal efficiency when they are introduced into the mixing chamber simultaneously with the chloral charge, but via a separate adduct line.

The proportion of catalyst employed in proportion to chloral monomer or to the monomer mixture defined above may vary from about 0.01% to 10% by weight of the monomer, with the preferred amount of catalyst employed being about 0.5% to 1.0% by weight of the total monomer used.

As preferred catalysts for the initiation of the polymerization, organometallic compounds may be used, e.g. butyl lithium, diethyl zinc, cadmium dialkyl and the like, since these materials effect the conversion of chloral monomer to the high molecular weight polymers desired. As discussed previously, however, these catalysts effect only moderate conversion of chloral, i.e., only about 20% to 25% of the monomer is converted to polymer in the reaction. By using as catalyst, a "hindered" lithium compound, such as 2,6-dimethoxy-phenyl lithium or 9-fluorenyl lithium, polymers may be obtained having higher number average molecular weights than those obtained when "non-hindered" organo-metallic catalysts are employed. Polymer films likewise may be formed easily by casting a polymerization mixture incorporating these less reactive catalysts. Additionally, we have also found that the use of a "hindered" lithium in combination with a non-hindered organometallic, e.g., diethyl zinc, may convert up to 80% of chloral to high molecular weight polymer, with the resultant polymeric mixture being easily cast in the process to the film product. Accordingly, the ratio in which the components are generally combined in the preferred catalyst system for the process is about 1 to 8 parts by weight of diethyl zinc to 1 part 2,6-dimethoxyphenyl lithium. Most advantageously employed is a catalyst complex containing about 3 to 5 parts by weight diethyl zinc to 1 part 2,6-dimethoxyphenyl lithium, which is the ratio of said catalyst components herein preferred.

The temperature of the polymerization may vary between +20° C. and −100° C., with the preferred reaction temperature varying between −50° and −80° C.

In general, the total process, i.e., from the addition and mixing of the polymerization ingredients to the recovery of the finished film or sheeting product may be accomplished in about 6 hours. During a major portion of this time period (which portion is about 4 hours) the reaction mixture is in the mixing chamber, wherein the monomer is partially polymerized prior to being cast into film. It is important to regulate the degree to which the monomer is polymerized in the chamber, since the percentage of converted monomer present therein will affect the viscosity of the resulting polymeric mixture. By controlling the extent of monomer conversion in the mixing chamber, therefore, it is possible to control the flow of the polymeric mixture as it is dropped onto the belt.

It is preferred to use a solvent in the reaction as it provides an efficient means for controlling the viscosity and flow characteristics of the polymeric mixture. Solvents which generally may be employed are either aliphatic or aromatic hydrocarbons having melting points which are lower than the reaction temperature, for example, n-heptane, propylene, or toluene. Introduced into the mixing chamber through a pipeline provided, the solvent is generally employed in about equimolar proportion to the monomer charge.

The polymerization of the polymeric mixture is substantially completed while it is carried on the moving belt through the chamber. During this period, the speed of the belt may likewise be adjusted so that the highest conversion of monomer may be effected.

The thickness of the polymeric film or sheeting product obtained may be varied over wide limits, i.e., a thickness ranging from about 10 mils to 75 mils. The thickness of these products may be accurately controlled by several variable factors involved in the process, such as the percentage of converted monomer in the polymeric mixture, the viscosity or flow properties of said mixture and the rate at which it is deposited on the belt as well as the height above the belt to which the casting blade has been adjusted.

Other modifications may be made in the process which are within the scope of the invention. Instead of allowing the polymeric mixture to flow from the mixing chamber by gravity, for example, a pump may be employed to withdraw this material and deposit it on the belt. Additionally, provision may be made to stabilize the polymeric film or sheeting product against thermal degradation, for example, by contacting it with a suitable stabilizing agent. Such a stabilizing treatment may be effected simultaneously with the washing treatment, or in a subsequent operation.

Instead of being deposited onto the moving belt, as illustrated by the drawing, the polymeric mixture may easily be cast onto a rotating drum or onto a horizontal rotating wheel.

The present invention may likewise be modified by contacting the monomer, or monomer mixture, with the polymerization catalyst initially in the casting chamber and thereafter effecting the entire polymerization reaction while the resultant monomer-catalyst mixture is contained in this chamber. In this particular modification of the process of this invention, the polymerization catalyst solution is applied onto the solid substrate directly through an adduct line provided, instead of being first contacted with the chloral or its monomer mixture in the mixing chamber and partially reacted therein. As the polymerization catalyst is thus being applied to the substrate, the liquid monomer or monomer mixture is applied thereto and intimately contacted with said catalyst. The monomer ingredient may be applied with or without additional organic liquid, as solvent. If a solvent is employed, this material is admixed with the chloral or its monomer mixture in the mixing chamber prior to being cast on the substrate. Furthermore, during a major portion of the reaction time period, i.e., for about 5 hours, the ingredients are contained in the casting chamber, and the polymerization is completed within this time.

It is to be understood that, although the invention has been described with specific reference to particular embodiments thereof, it is not to be so limited, since changes and alterations therein may be made which are within the full intended scope of this invention as defined by the appended claims.

What is claimed is:

1. A process for polymerizing chloral monomer directly to a tough and durable film of high molecular weight polychloral which comprises thoroughly mixing in a reaction chamber liquid chloral and a polymerization catalyst selected from the group consisting of 2,6-dimethoxyphenyl lithium, 9-fluorenyl lithium and combinations thereof with diethyl zinc, partially polymerizing said chloral monomer in the reaction chamber, removing therefrom a flowable mixture of chloral polymer, unreacted chloral and polymerization catalyst and depositing said mixture on a solid substrate in a second reaction chamber, completing the polymerization of the polymeric material and forming a film thereof while maintaining it at the polymerization temperature and passing it through the second reaction chamber, thereafter washing and drying the polychloral film product obtained.

2. A continuous process for polymerizing chloral monomer directly to a tough and durable film of high molecular weight polychloral which comprises introducing liquid chloral and a polymerization catalyst selected from the group consisting of 2,6-dimethoxyphenyl lithium, 9-fluorenyl lithium and combinations thereof with diethyl zinc into a reaction chamber maintained at the polymerization temperature, partially polymerizing therein said chloral monomer in the presence of an inert organic liquid reaction medium, removing from said reaction chamber a flowable mixture of chloral polymer, unreacted chloral and polymerization catalyst and depositing said mixture as a thin layer on a solid substrate in a second reaction chamber, completing the polymerization of the polymeric material and forming a film thereof while maintaining it at the polymerization temperature and passing it through the second reaction chamber, thereafter washing and drying the polychloral film product obtained.

3. A process for polymerizing chloral monomer directly to a tough and durable film of high molecular weight polychloral which comprises introducing liquid chloral into a reaction chamber maintained at a temperature between +20° C. and −100° C., introducing into said reaction chamber, a polymerization catalyst comprising an organolithium compound selected from the group consisting of 2,6-dimethoxyphenyl lithium and 9-fluorenyl lithium in admixture with diethyl zinc, said catalyst complex being added at a rate which is equivalent to a total catalyst concentration varying between about 0.01% to 10% by weight of the chloral, thoroughly mixing in the reaction chamber said liquid chloral and said polymerization catalyst in the presence of an inert organic liquid reaction medium and partially polymerizing therein said chloral, removing from said reaction chamber a flowable mixture of chloral polymer, unreacted chloral and polymerization catalyst and depositing said mixture as a thin layer on a moving solid substrate in a second reaction chamber, completing the polymerization of the polymeric material and forming a film thereof while maintaining it a temperature between +20° C. and −100° C. and passing it through the second reaction chamber, thereafter washing and drying the polychloral film product obtained.

4. The process of claim 3 wherein the hindered organolithium compound is 2,6-dimethoxyphenyl lithium.

5. The process of claim 3 wherein the polymerization catalyst complex is added to the reaction mixture as a solution in an inert organic liquid, with the components of said catalyst complex being combined in a ratio of about 1 to 8 parts by weight of diethyl zinc to 1 part 2,6-dimethoxphenyl lithium.

6. The process of claim 3 wherein the polymerization catalyst solution is comprised of about 3 to 5 parts by weight of diethyl zinc to 1 part 2,6-dimethoxyphenyl lithium, said catalyst complex being employed in the reaction in an amount which is about 0.5% to 1.0% by weight of the monomer employed.

7. The process of claim 3 wherein the polymerization temperature maintained in the first reaction zone and in the second reaction zone is between −50° to −80° C., and wherein the total reaction time is about 6 hours.

8. The process of claim 3 which is a continuous process.

9. A process for polymerizing chloral monomer directly to a tough and durable film of high molecular weight polychloral which comprises applying onto a moving solid substrate in a reaction chamber, a polymerization catalyst for said chloral selected from the group consisting of 2,6-dimethoxyphenyl lithium, 9-fluorenyl lithium and combinations thereof with diethyl zinc, applying onto said solid substrate liquid chloral monomer so that said catalyst and said monomer are intimately admixed thereon, effecting the polymerization of the monomer-catalyst mixture and forming a film of the chloral polymer being formed while it is supported in the reaction chamber and maintained at the polymerization temperature, thereafter washing and drying the polychloral film product obtained.

10. The process of claim 3 wherein the hindered organolithium compound is 9-fluorenyl lithium.

References Cited by the Examiner

UNITED STATES PATENTS

| 2,627,088 | 2/1953 | Alles et al. | 18—57 |
| 2,952,878 | 9/1960 | Swerlick et al. | 260—67 |
| 2,971,222 | 2/1961 | Weissman | 18—57 |
| 2,982,758 | 5/1961 | Michaud | 260—67 |
| 3,093,617 | 6/1963 | Hudgin et al. | 260—67 |

OTHER REFERENCES

Furukawa et al., Die Makromolekulare Chemie, vol. 44, March 1961, pp. 398–407 (pp. 398–404 relied on).

WILLIAM H. SHORT, *Primary Examiner.*

JOSEPH R. LIBERMAN, *Examiner.*

L. M. MILLER, *Assistant Examiner.*